(12) United States Patent
Ideguchi et al.

(10) Patent No.: US 6,730,274 B1
(45) Date of Patent: May 4, 2004

(54) EXHAUST HEAT EXCHANGER WITH CATALYST

(75) Inventors: Takahiro Ideguchi, Wako (JP); Shuko Shincho, Tokyo (JP); Hisao Hagiwara, Tokyo (JP)

(73) Assignees: Honda Giken Koygo Kabushiki Kaisha, Tokyo (JP); Toyo Radiator Co., Ltd, Tokyo (JP)

( * ) Notice: Subject to any disclaimer, the term of this patent is extended or adjusted under 35 U.S.C. 154(b) by 0 days.

(21) Appl. No.: 09/515,518

(22) Filed: Feb. 29, 2000

(30) Foreign Application Priority Data

Mar. 4, 1999 (JP) ............................................ 11-057670

(51) Int. Cl.[7] ................................................ F01N 3/10
(52) U.S. Cl. ........................................ 422/173; 422/177
(58) Field of Search ................................ 422/173, 177; 165/73; 60/298, 320

(56) References Cited

U.S. PATENT DOCUMENTS

| | | | | |
|---|---|---|---|---|
| 4,426,844 A | * | 1/1984 | Nakano ........................ | 60/295 |
| 5,033,264 A | | 7/1991 | Cabral ......................... | 60/274 |
| 5,916,530 A | * | 6/1999 | Maus et al. .................. | 422/179 |

FOREIGN PATENT DOCUMENTS

| | | |
|---|---|---|
| DE | 30 39 742 A1 | 5/1982 |
| DE | 198 17 340 A1 | 11/1998 |
| DE | 198 17 342 A1 | 11/1998 |
| JP | 58-005422 | 1/1983 |
| JP | 58-222910 | 12/1983 |
| JP | 3-015616 | 1/1991 |

* cited by examiner

*Primary Examiner*—Hien Tran
(74) *Attorney, Agent, or Firm*—Westerman, Hattori, Daniels & Adrian, LLP

(57) ABSTRACT

An exhaust heat exchanger with catalyst to be used in an exhaust system of an internal combustion engine is provided. A catalyst chamber is disposed within a water chamber which a cooling water flows through. An exhaust gas having passed through the catalyst chamber in contact with a catalyst makes an indirect heat exchange with the cooling water before it is discharged outside. The water chamber is formed surrounded by an inner trunk and an outer trunk, and the catalyst chamber is formed by a cylindrical body disposed coaxially with the inner and outer trunks and housing the catalyst. A spiral passage for the exhaust gas is formed between the inner trunk and the cylindrical body. A plurality of heat transmitting pipes are arranged within the water chamber surrounding the inner trunk circumferentially at regular intervals. The exhaust gas having passed through the catalyst flows within the spiral passage and the heat transmitting pipes in turn to make a heat exchange with the cooling water. The cylindrical body is surrounded by a heat shielding cylindrical body with a thin adiabatic gas layer lying between.

5 Claims, 4 Drawing Sheets

F I G. 2
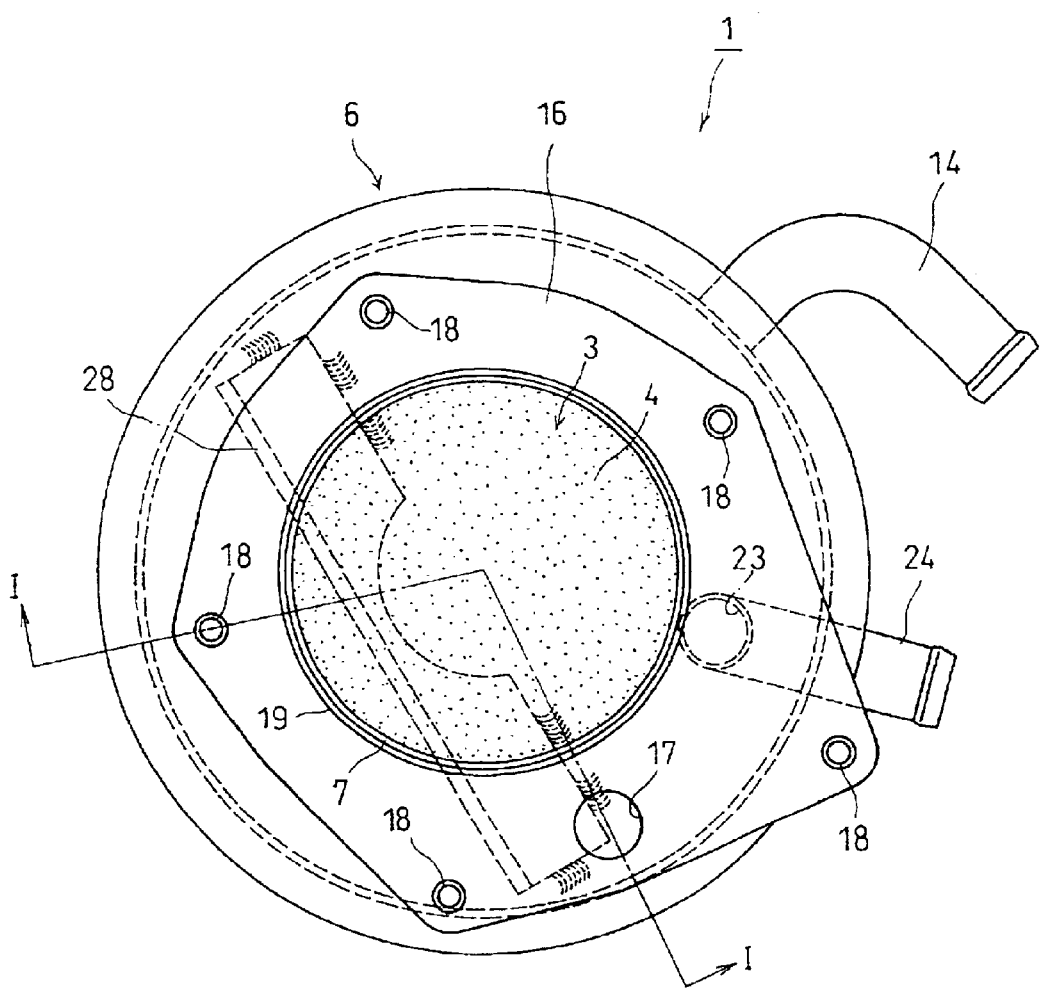

EXHAUST HEAT EXCHANGER WITH CATALYST

BACKGROUND OF THE INVENTION

The present invention relates to an exhaust heat exchanger with catalyst in which an exhaust gas purification apparatus (a catalytic converter) utilizing a catalyst for using in an exhaust system of an internal combustion engine is combined with a heat exchanger for recovering heat of the exhaust gas to make the exhaust system compact and improve silencer effect and heat exchanger performance.

Heretofore, the exhaust system in this kind of internal combustion engine has been constituted as shown in FIG. 4.

Namely, in FIG. 4, an exhaust gas discharged from an internal combustion engine 01 firstly enters an exhaust gas purification apparatus (a catalytic converter) 02 where injurious components in the exhaust gas are purified, and then the exhaust gas is discharged from the converter.

Then, the purified and somewhat warmed exhaust gas enters a heat exchanger 03 where the exhaust gas makes a heat exchange with a cooling water of the internal combustion engine and gives its heat to the cooling water, and the exhaust gas itself which has been cooled is discharged is discharged from the heat exchanger.

The cooling water entering the heat exchanger 03 has been sufficiently cooled by making a heat exchange with a cold water such as city water in a heat exchanger 04 for recovering exhaust heat which the cooling water passes through after it comes out of the internal combustion engine 01. Therefore, the purified and somewhat warmed exhaust gas can be cooled effectively. Though the cooling water is somewhat warmed by the heat exchange, it is returned to the engine 01 and cools various parts of the engine 01 without difficulty.

The city water warmed by the heat exchange with the cooling water in the heat exchanger 04 is directed to a hot-water supply facility, an air conditioning facility, or the like, of a place of business or a home to be used as hot-water directly or as heat source of hot-water.

As mentioned above, in the exhaust system of the conventional internal combustion engine 01, the exhaust gas purification apparatus 02 is disposed on an upper stream side of an exhaust gas passage and formed separately from the heat exchanger 03. Therefore, a space is required for constituting the exhaust system, moreover, construction of the system is complicated.

SUMMARY OF THE INVENTION

The present invention aims to solve the aforementioned problems of the exhaust system in the conventional internal combustion engine 01, and provide an exhaust heat exchanger with catalyst in which the exhaust system is made compact, the construction is simplified, the manufacturing cost is reduced and silencer effect and heat exchange performance can be improved.

The present invention provides an exhaust heat exchanger with catalyst, comprising a water chamber which a cooling water flows through and a catalyst chamber housing a catalyst which an exhaust gas flows through in contact with the catalyst, thereby the exhaust gas coming out of the catalyst chamber makes an indirect heat exchange with the cooling water before the exhaust gas is discharged outside.

In this invention, the catalyst chamber corresponding to an exhaust gas purification apparatus (a catalytic converter) used in a exhaust system of an internal combustion engine is provided within the water chamber and the exhaust gas having passed through the catalyst chamber makes an indirect heat exchange with the cooling water in the water chamber, thus the exhaust purification apparatus is integrally combined with a heat exchanger for recovering heat of the exhaust gas.

As the result, the exhaust system of the internal combustion engine can be made compact and simplified in construction and the manufacturing cost thereof can be reduced.

Since the catalyst chamber is surrounded by the water chamber, heat possessed by the exhaust gas and reaction heat between the exhaust gas and the catalyst are absorbed by the cooling water in the water chamber sufficiently to improve heat exchange performance.

Though the exhaust system is made compact by combining a exhaust purification apparatus and a heat exchanger for recovering heat of exhaust gas integrally as a unit, capacity of the whole unit is larger than that of the conventional individual exhaust gas purification apparatus or heat exchanger for recovering heat of exhaust gas. Therefore, noise generated by the exhaust gas is damped when the exhaust gas flows through a chamber of large capacity. The damping of the noise is further enhanced by the water chamber surrounding the chamber of large capacity so as to confine it. Thus, an improved silencer effect can be obtained.

The water chamber may be formed between an inner trunk and an outer trunk, the catalyst chamber may be formed by a cylindrical body disposed coaxially with the inner and outer trunks, the catalyst may be disposed within the cylindrical body, a spiral passage for the exhaust gas may be formed between the inner trunk and the cylindrical body, and a plurality of heat transmission pipes may be arranged surrounding the inner trunk circumferentially at regular intervals, thereby the exhaust gas flows within the catalyst, flows into the spiral passage, then flows within the heat transmission pipes to make a heat exchange with the cooling water.

As the result, the exhaust heat exchanger with catalyst presents a whole appearance of a columnar shape, because the outer trunk, the heat transmission pipes, the inner trunk, the spiral passage, the cylindrical body (catalyst chamber) and the catalyst are disposed concentrically. Therefore, the heat exchanger can be made further compact, the construction can be simplified and the manufacturing cost can be reduced.

Since the exhaust gas flows passing through the catalyst, the spiral passage and the heat transmission pipes in the water chamber in turn, a sufficient heat exchanging area is ensured by the inner trunk and the heat transmission pipes, and the exhaust gas makes a sufficient heat exchange with the cooling water to improve heat exchange performance.

The cylindrical body may be surrounded by a heat shielding cylindrical body with a thin adiabatic gas layer lying between.

Since the adiabatic gas layer lies between the spiral passage and the catalyst, and a hot exhaust gas having just passed through the catalyst enters the adiabatic gas layer from a bottom of the layer, temperature of the exhaust gas in the spiral passage is hardly transmitted to the catalyst, and even if the exhaust gas in the spiral passage is cooled by the cooling water in the water chamber, lowering of temperature of the catalyst can be prevented, so that purification of injurious components in the exhaust gas is promoted to improve exhaust gas purification performance.

Because the hot exhaust gas enters the adiabatic gas layer on outside of the catalyst, a time required for activating the catalyst after the engine is started is shortened to promote purification of injurious components in the exhaust gas, and the exhaust purification performance is improved also in this aspect.

BRIEF DESCRIPTION OF THE DRAWINGS

FIG. 2 is a plan view of the exhaust heat exchanger with catalyst;

DETAILED DESCRIPTION OF PREFERRED EMBODIMENT OF THE INVENTION

Figure 3:
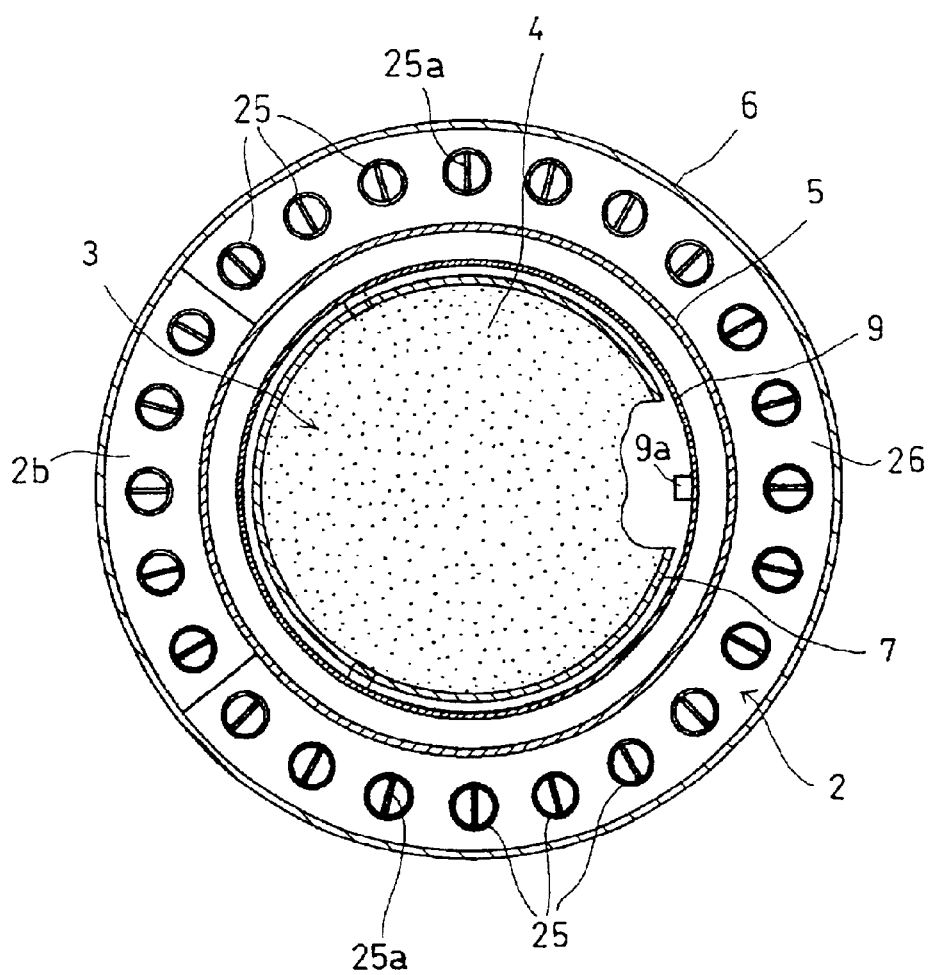
FIG. 3 is a cross sectional view taken along the line III—III of FIG. 1.
Figure 4:
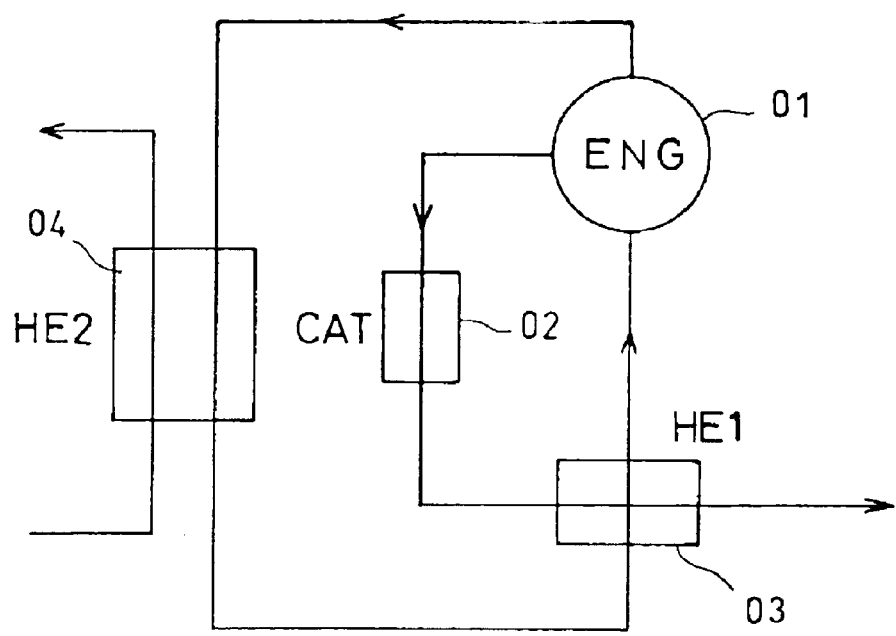
FIG. 4 is an illustration showing a prior art.

Hereinafter, a preferred embodiment of the present invention will be described with reference to FIGS. 1 to 3.

Figure 1:
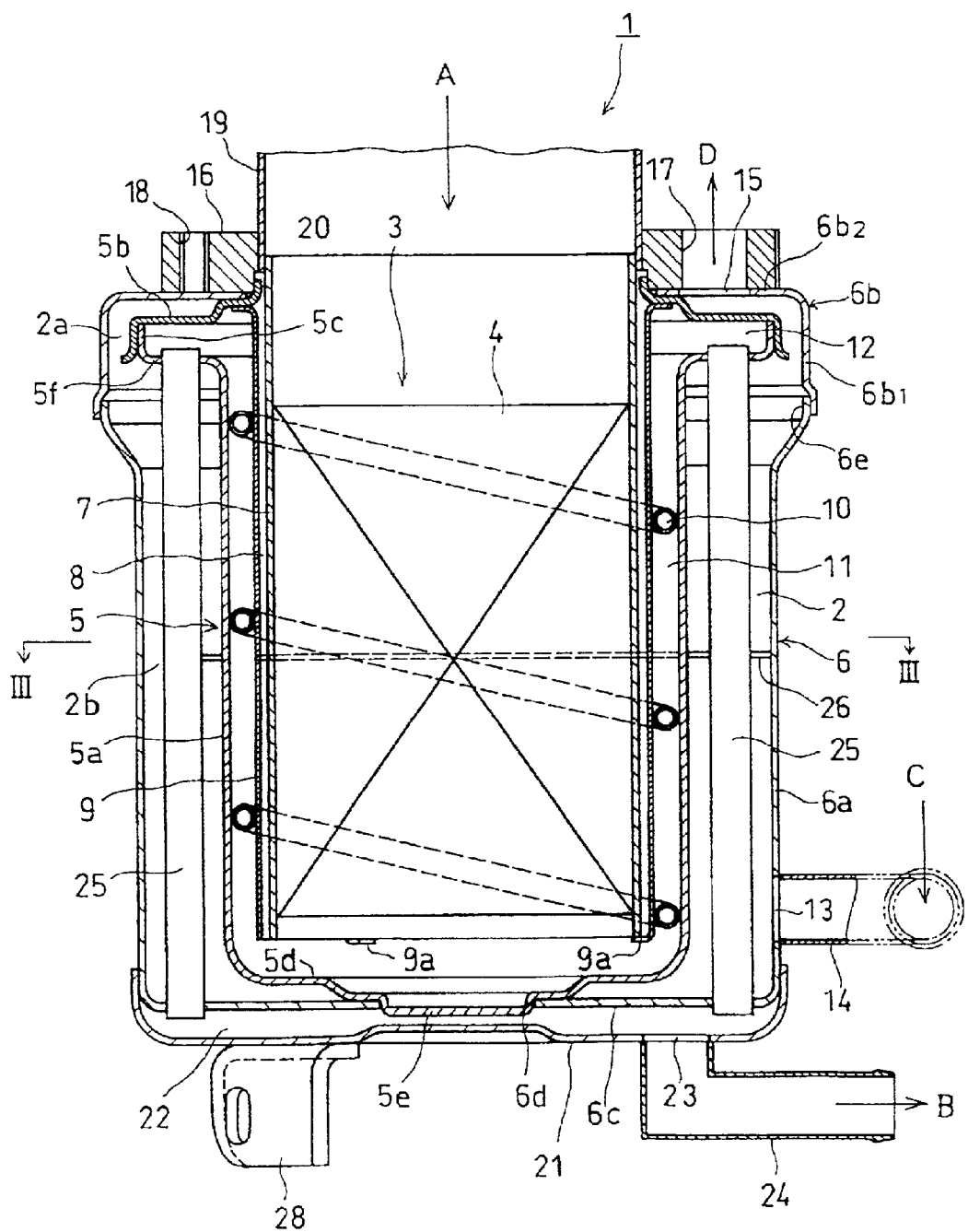
FIG. 1 is a vertical sectional view of an exhaust gas exchanger with catalyst according to a preferred embodiment of the present invention.

FIG. 1 is a vertical sectional view of an exhaust heat exchanger with catalyst according to an embodiment of the invention which corresponds to a section taken along the line I—I of FIG. 2. FIG. 2 is a plan thereof and FIG. 3 is a cross sectional view taken along the line III—III of FIG. 1.

The exhaust heat exchanger with catalyst is used in an exhaust system of an internal combustion engine for an isolated power plant, in which an exhaust gas purification apparatus utilizing catalyst (a catalytic converter) and a heat exchanger for recovering heat of exhaust gas are combined integrally.

The exhaust heat exchanger with catalyst 1 shown in FIG. 1 has a water chamber 2 which a cooling water flows through and a catalyst chamber 3 provided in the water chamber 2. An exhaust gas enters the catalyst chamber 3 as shown by the arrow A to pass through the catalyst chamber in contact with a catalyst 4, then, after leaving the chamber 3, makes an indirect heat exchange with the cooling water in the water chamber, and finally flows within an exhaust pipe 24 in the direction of arrow B to be discharged outside.

The water chamber 2 is formed between an inner trunk 5 and an outer trunk 6. The catalyst chamber 3 is formed by a cylindrical body 7 which is disposed concentrically or coaxially with the inner trunk 5 and the outer trunk 6. Within the cylindrical body 7 is accommodated the catalyst 4. The circumference of the cylindrical body 7 is surrounded by a heat shielding cylindrical body 9 forming a thin adiabatic gas layer 8 between them.

In an annular gap between the inner trunk 5 and the heat shielding cylindrical body 9 is formed a spiral passage 11 by a spiral pipe 10. The exhaust gas which has passed through the catalyst, then enters the spiral passage 11 and flows within the passage 11 upward turning.

The inner trunk 5 is composed of a bottomed-cylinder body section 5a and an annular lid section 5b. A periphery of the annular lid section 5b is bent downward to form a short cylindrical portion. On an upper opening side of the body section 5a is formed an axially short enlarged cylindrical section 5c and an peripheral wall of the section 5c is fitted in the above-mentioned short cylindrical portion of the lid section 5b. Thus, the lid section 5b closes the enlarged cylindrical section 5c to form an annular exhaust gas turning chamber 12.

The lid section 5b has an annular flat portion formed along its inner peripheral edge, and on a lower surface of the annular flat portion is fixed a flange part of the heat shielding cylindrical body 9 formed at an upper end thereof, to close an upper end portion of the spiral passage 11 formed between the inner trunk 5 and the heat shielding cylindrical body 9.

A bottom part 5d of the bottomed-cylinder body section 5a is slightly swelled downward stepwise concentrically, and a central swelled portion 5e of the bottom part 5d is liquid-tightly fitted to a circular hole 6d formed at a bottom part 6c of a bottomed-cylinder body section 6a of the outer trunk 6, so that the bottom part 5d of the inner trunk 5 and the bottom part 6c of the outer trunk 6 is fixed to each other liquid-tightly.

The outer trunk 6 is composed of the bottomed-cylinder body section 6a and a shallow inverted-cup-like lid section 6b having a central circular hole. The lid section 6b has a short cylindrical portion 6b1 on an outer peripheral side, and an outer peripheral wall of an axially short diametrically enlarged cylindrical section 6e on an upper opening side of the body section 6a is fitted to the cylindrical portion 6b1 so that the lid section 6b closes the upper opening of the body section 6a annularly.

An inner peripheral edge of a bottom part 6b2 of the inverted-cup-like lid section 6b is liquid-tightly fixed to an upper surface of the annular flat portion of the annular lid section 5b formed along its inner peripheral edge.

Therefore, the water chamber 2 of annular cross section formed between the inner trunk 5 and the outer trunk 6 is closed up tight by fixation of the lid sections 6b, 5b at an upper portion and fixation of the bottom parts 5d, 6c at a lower portion.

The inverted-cup-like lid section 6b covers an outer wall of the annular exhaust gas turning chamber 12 from above and side to form an annular water chamber part 2a of L-shaped vertical section between the wall and the lid section 6b.

The bottom part 6b2 of the lid section 6b is formed with an outlet opening 15 for the cooling water the flow of which is indicated by arrow D. The outlet opening 15 communicates with a circular hole 17 formed in a flange 16 fixed to an outer surface of the bottom part 6b2. A cooling water outlet pipe (not shown) is connected to the circular hole 17.

As shown in FIG. 2, the flange 16 is formed with a plurality of bolt holes 18 which are used for fixedly attaching the exhaust gas pipe 19. An end of the exhaust gas pipe 19 is fitted and supported in an annular gap formed between a central circular hole 20 of the flange 16 and an upper end portion of the cylindrical body 7.

As shown in FIG. 1, the central circular hole 20 of the flange 16 has a diametrically enlarged lower half portion and in a space within the enlarged portion and under a lower end of the pipe 19 is inserted a short cylindrical portion projecting upward from the inner peripheral edge of the annular lid section 5b.

The cylindrical body 7 holds the catalyst in a body as mentioned above, and a lower end of the cylindrical body 7 is supported by nails 9a formed by bending some parts of a lower end of the heat shielding cylindrical body 9. The nails 9a (three pieces for example) are arranged circumferentially at regular intervals.

A cooling water inlet opening 13 to the water chamber 2 is formed at a lower portion of the body section 6a of the outer trunk 6, and a cooling water inlet pipe 14 is connected to the inlet opening 13. The flow of cooling water, indicated by arrow C, passes through the inlet pipe 14 and through the opening 13 to the water chamber 2.

A shallow plate-like bottom lid wall 21 is fitted to the bottom part 6c of the body section 6a of the outer trunk 6 to form an exhaust gas gathering chamber 22 between the bottom lid wall 21 and the bottom part 6c. The gathering chamber 22 communicates with the exhaust pipe 24 through an exhaust gas outlet opening 23 formed in the bottom lid wall 21 for the discharge of exhaust gas indicated by arrow B.

A plurality of heat transmitting pipes 25 extend from a step wall 5f connecting the inner trunk body section 5a with the enlarged cylindrical section 5c to the bottom part 6c of the outer trunk body section 6a. These heat transmitting pipes 25 are arranged surrounding the body section 5a at regular intervals. Each heat transmitting pipe 25 has an upper end communicating with the exhaust gas turning chamber 12 and a lower end communicating with exhaust gas gathering chamber 22. In the heat transmitting pipe 25 is inserted a spiral fin 25a (FIG. 3).

The water chamber 2 having an annular cross section is partitioned by a partition plate 26 up and down at a vertically middle portion. The heat transmitting pipes 25 penetrate the partition plate 26. A part of a periphery of the partition plate 26 is cut in a fan-shape to form a communication water passage 2b connecting upper and lower parts of the water chamber 2.

On an lower surface of the bottom lid wall 21 is fixed a bracket 28 for attachment of the exhaust heat exchanger with catalyst 1.

An exhaust gas discharged from an internal combustion engine (not shown) flows within the exhaust gas pipe 19 in direction of the arrow A to enter the catalyst chamber 3, then flows within the catalyst 4 in the catalyst chamber 3 in contact with the catalyst to be purified by oxidation reaction or the like.

The exhaust gas coming out of the catalyst chamber 3 enters the spiral passage 11 in which the exhaust gas makes a heat exchange with the cooling water in the water chamber 2 through the wall surface of the inner trunk 5. Then the exhaust gas turns within the exhaust gas turning chamber 12 to enter the heat transmitting pipes 25 in which the exhaust gas makes a heat exchange with the cooling water in the water chamber 2 again. After that, the exhaust gas gathers in the gathering chamber 22.

The exhaust gas in the gathering chamber 22 releases remaining heat to the cooling water in the water chamber 2 through the wall surface of the bottom part 6c of the outer trunk 6 and flows within the exhaust pipe 24 in direction of the arrow B to be finally discharged outside.

On the other side, the cooling water flowing within the cooling water inlet pipe 14 in the direction of arrow C enters the lower part of the water chamber 2 partitioned by the partition plate 26. In the lower part, the cooling water makes a heat exchange with an exhaust gas flowing in the heat transmitting pipe 25 through a lower half part of the heat transmitting pipe 25 sufficiently and further makes a heat exchange with an exhaust gas flowing in the spiral passage 11 thought a lower half of the wall surface of the inner trunk 5 sufficiently. Then, the cooling water flows through the communication water passage 2b upward and enters the upper part of the water chamber 2 partitioned by the partition plate 26.

The cooling water in the upper part of the water chamber makes a heat exchange with the exhaust gas flowing in the heat transmitting pipe 25 through an upper half part of the heat transmitting pipe 25 sufficiently and further makes a heat exchange with the exhaust gas flowing in the spiral passage 11 through an upper half of the wall surface of the inner trunk 5 sufficiently. Then the cooling water passes through the annular water chamber part 2a, the outlet opening 15 and the circular hole 17 in turn, then flows in a cooling water pipe (not shown) in direction of the arrow D to be returned to an internal combustion engine (not shown).

According to the above-mentioned embodiment, the catalyst chamber 3, which corresponds to an exhaust purification apparatus using catalyst (catalytic converter) for an exhaust system of an internal combustion engine, is provided in the water chamber 2 and the exhaust gas having passed through the catalyst chamber 3 makes a heat exchange with the cooling water in the water chamber 2 through the inner trunk 5 and the heat transmitting pipes 25. That is, an exhaust gas purification apparatus and a heat exchanger for recovering heat of the exhaust gas is combined integrally. As the result, the exhaust system of the internal combustion engine can be made compact, the construction can be simplified and the manufacturing cost can be reduced.

Since the catalyst chamber 3 is surrounded by the water chamber 2 and the exhaust gas flows through the catalyst 4, the spiral passage 11 and the heat transmitting pipes 25 provided in the water chamber 2 in turn, a sufficient heat exchange area can be ensured by the inner trunk 5 and the heat transmitting pipes 25, heat held in the exhaust gas and heat caused by reaction of the exhaust gas and the catalyst 4 are sufficiently absorbed by the cooling water in the water chamber 2, and the heat exchange performance is improved.

Though the exhaust system is made compact by combining an exhaust purification apparatus and a heat exchanger for recovering heat of exhaust gas integrally as a unit, capacity of the whole unit is larger than that of the conventional individual exhaust gas purification apparatus or heat exchanger for recovering heat of exhaust gas. Therefore, noise generated by the exhaust gas is damped when the exhaust gas flows through a chamber of large capacity. The damping of the noise is further enhanced by the water chamber 2 surrounding the chamber of large capacity so as to confine it. Thus, an improved silencer effect can be obtained.

The water chamber 2 is formed between the inner trunk 5 and the outer trunk 6; the catalyst chamber 3 formed by the cylindrical body 7 is disposed concentrically with respect to the inner trunk 5 and the outer trunk 6; the catalyst 4 is disposed in the cylindrical body 7; the spiral passage 11 for the exhaust gas is formed between the body section 5a of the inner trunk 5 and the heat shielding cylindrical body 9; and the heat transmitting pipes 25 are provided in the water chamber 2 surrounding the inner trunk 5 circumferentially at regular intervals.

As the result, the outer trunk 6, the heat transmitting pipes 25, the inner trunk 5, the spiral passage 11, the cylindrical body 7 (catalyst chamber 3) and the catalyst 4 are disposed and constructed concentrically with each other. Therefore, the whole appearance of the exhaust heat exchanger with catalyst 1 presents a columnar shape to be made more compact; the construction can be more simplified; and the manufacturing cost can be reduced.

The cylindrical body 7 is surrounded by the heat shielding cylindrical body 9 with the thin adiabatic gas layer 8 lying between. Therefore, since the adiabatic gas layer 8 lies between the spiral passage 11 and the catalyst 4, and hot exhaust gas having just passed through the catalyst 4 enters the adiabatic gas layer 8 from bottom of the layer, temperature of the exhaust gas in the spiral passage 11 is hardly transmitted to the catalyst 4, and even if the exhaust gas in the spiral passage 11 is cooled by the cooling water in the water chamber 2, lowering of temperature of the catalyst 4 can be prevented, so that purification of injurious components in the exhaust gas is promoted to improve exhaust gas purification performance.

Because the hot exhaust gas enters the adiabatic gas layer 8 on outside of the catalyst 4, a time required activating the catalyst 4 after the engine is started is shortened to promote purification of injurious components in the exhaust gas, and the exhaust gas purification performance is improved also in this aspect.

The exhaust gas is sufficiently cooled during it goes up its rise within the spiral passage 11 by making a sufficient heat exchange with the cooling water in the water chamber 2 through the wall surface of the inner trunk 5. Therefore, the exhaust gas entering the exhaust gas turning chamber 12 is so cool that joint parts of the heat transmitting pipes 25 stiffer no thermal shock, and reliability of the exhaust heat exchanger with catalyst 1 can be improved.

In the above-mentioned embodiment, the exhaust heat exchanger with catalyst 1 is of a vertical type, but it may be of a horizontal type. Otherwise, various modifications are possible without departing from the scope of the present invention.

What is claimed is:

1. An exhaust heat exchanger with catalyst, comprising a water chamber which a cooling water flows through, said water chamber being formed between an inner trunk and an outer trunk, and a catalyst chamber housing a catalyst which an exhaust gas flows through in contact with said catalyst, said catalyst chamber being formed by a cylindrical body disposed coaxially with said inner and outer trunks, wherein said catalyst is disposed within said cylindrical body, a spiral passage for said exhaust gas is formed between said inner trunk and said cylindrical body, and a plurality of heat transmitting pipes are arranged surrounding said inner trunk circumferentially at regular intervals, whereby said exhaust gas flows within said catalyst, thereafter flows into said spiral passage, and then flows within said heat transmitting pipes to exchange heat indirectly with said cooling water before said exhaust gas is discharged from said heat exchanger.

2. An exhaust heat exchanger with catalyst as claimed in claim 1, wherein said cylindrical body of said catalyst chamber is surrounded by a heat shielding cylindrical body with an adiabatic gas layer lying between.

3. An exhaust heat exchanger with catalyst, as claimed in claim 2, wherein said spiral passage is formed by a spiral pipe disposed between said inner trunk and said heat shielding cylindrical body surrounding said cylindrical body.

4. An exhaust heat exchanger with catalyst, as claimed in claim 1, wherein said water chamber having an angular cross section is divided by a partition plate in an axial middle portion thereof, said heat transmitting pipes penetrating said partition plate and said partition plate having a communication water passage connecting the parts of said water chamber.

5. An exhaust heat exchanger with catalyst, as claimed in claim 1, wherein said heat transmitting pipes are connected to a gathering chamber to which is connected an exhaust pipe.

* * * * *